UNITED STATES PATENT OFFICE.

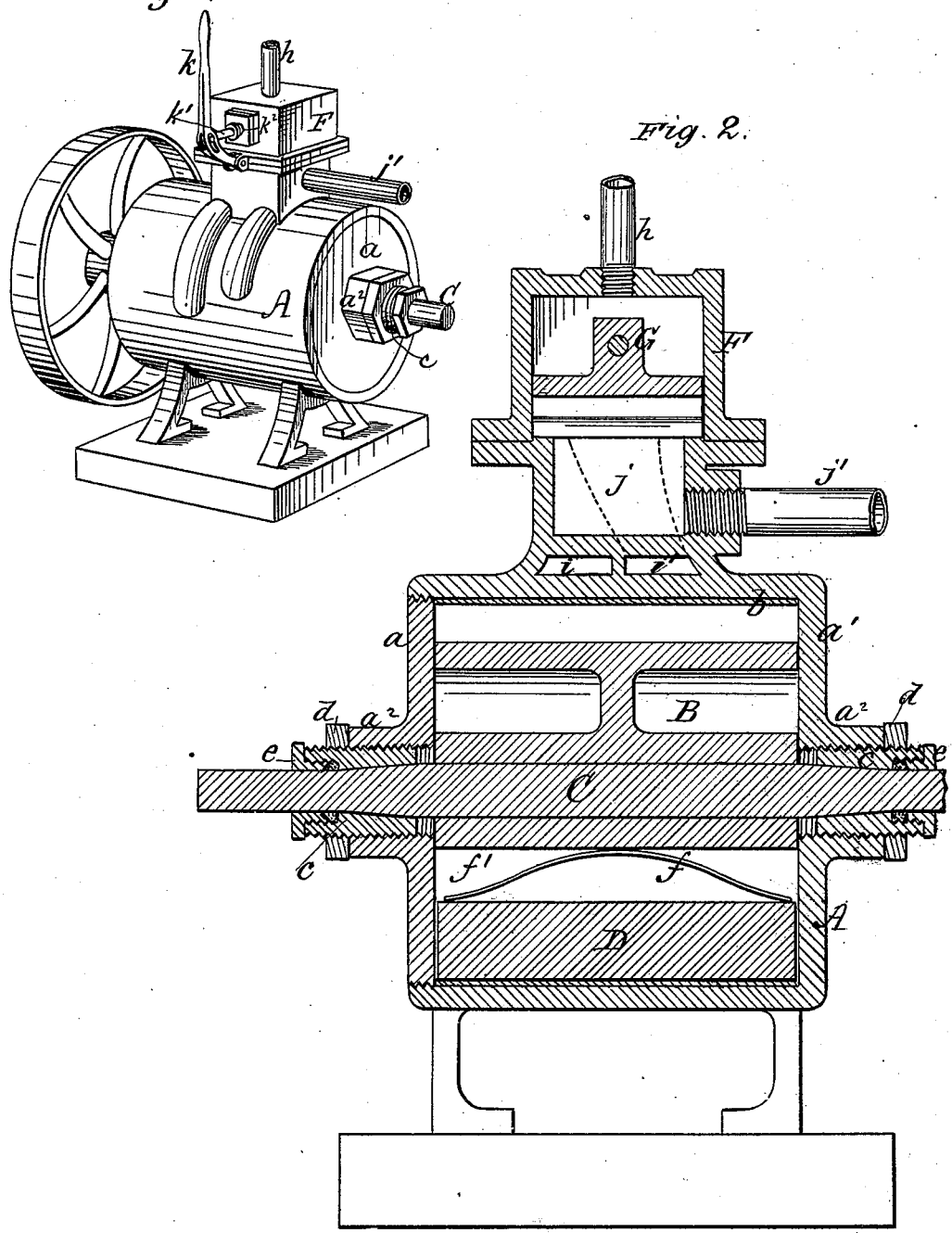

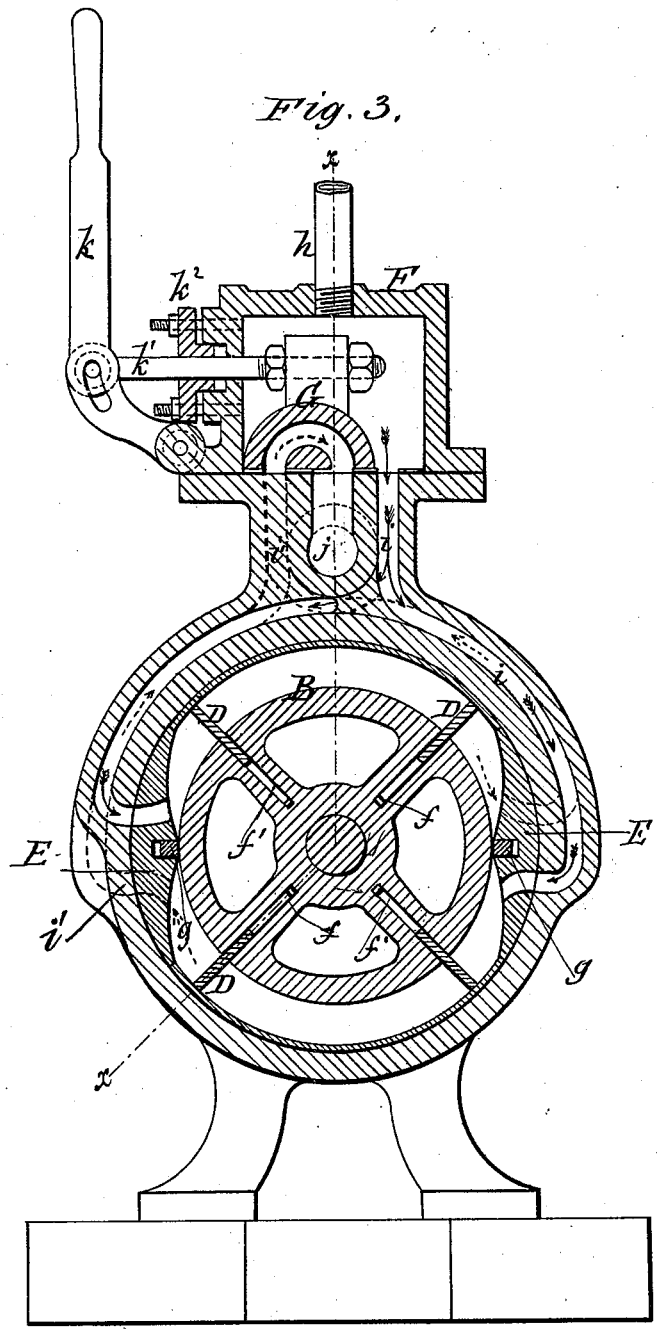

ALLEN B. HAUGHEY, OF JOPLIN, MISSOURI.

IMPROVEMENT IN ROTARY ENGINES.

Specification forming part of Letters Patent No. 212,463, dated February 18, 1879; application filed December 23, 1878.

*To all whom it may concern:*

Be it known that I, ALLEN B. HAUGHEY, of Joplin, in the county of Jasper and State of Missouri, have invented a new and useful engine for the conversion of steam, air, water, or other pressure into a useful purpose; and I do hereby declare that the following is a full, clear, and exact description of the construction and operation of the same, reference being had to the annexed drawings, making a part of this specification, and in which—

Figure 1 is a perspective view of my improved rotary steam-engine. Fig. 2 is a vertical longitudinal section of the same, taken on the line $x\,x$ of Fig. 3; and Fig. 3 is a vertical transverse section thereof.

The same part in the several figures is denoted by the same letter.

This invention, which relates to certain improvements in rotary steam-engines, consists in certain details of construction of the parts, substantially as hereinafter more fully set forth.

In the accompanying drawings, A refers to the steam-cylinder, supported upon any suitable means, preferably as shown. To this cylinder is supplied a readily-removable screw-threaded or bolted head, $a$, which, together with the head $a^1$, is provided with internally screw-threaded boxes $a^2\,a^2$. Within this cylinder is a lining, $b$, to prevent the wear of the cylinder by the pistons.

B is a revolving cylindrical piston, which, for the sake of lightness, &c., may be constructed, as shown, with spaces therein. The piston B is hung within the cylinder A upon a shaft, C, passing centrally through said piston, and with its projecting portions tapered outwardly, as shown, the object of which will appear hereinafter. The tapering portions of the shaft C are fitted with screw-threaded bushing or collars $c$, screwed into the boxes $a^2$. Nuts $d$ are screwed upon the threaded collars or bushing $c$, and, fitting against the boxes $a^2$, fasten the bushing in place upon the conical portions of the shaft C.

$e\,e$ are stuffing-box glands, screwed into screw-threaded cavities in the outer ends of the bushing $c$, and fitting upon the shaft C. These stuffing-boxes prevent the escape or waste of the lubricant or steam at these points.

It will be observed here that by this construction of the shaft and the use of the bushings and their adjuncts, wear is readily compensated, and the revolving piston B thus kept in true bearings, insuring uniform movement or working of the cylinder.

D D are piston-wings, which may be oblong or rectangular in shape, and seated upon springs $f$, let into radial sockets $f'$, made in the piston B. The springs $f$ expel the piston-wings D from the piston against the inner surface, or rather the lining, of the cylinder A, as seen in Figs. 2 and 3.

E E are abutments supplied to opposite sides of the inner surface of the cylinder A, the object of which is to gradually sink the piston-wings D into the piston B, and to allow them to be again projected in like manner from said piston, as clearly indicated in Fig. 3, while the piston B is in operation.

Let into sockets in each of the abutments E, and cushioned upon springs in said sockets, are packing strips or bars $g\,g$, which bear against the periphery of the piston B, to form steam-tight joints between the steam-supply and exhaust chambers of the cylinder A. These strips or packing are made preferably wider upon their faces than the faces of the piston-wings.

F is the steam-chest, surmounting the cylinder A, and communicating with the supply of steam by the pipe $h$, and with the steam-supplying and exhaust chambers of the cylinder A by the pipes or passages $i\,i'$. To the exhaust-chamber $j$ is supplied the exhaust-pipe $j'$.

G is a slide-valve, adjusted within the chest F, as shown, to change the flow of steam from one passage to the other of the two sets of passages $i\,i'$, one of which being indicated in dotted lines in Fig. 3, by which the motion of the engine may be reversed. The flow of steam by the proper movement of the valve can be entirely cut off when desired.

The valve G is operated or moved by the hand-lever $k$, connecting with its stem $k^1$, passing through a stuffing-cup or packing, $k^2$, fitted to the chest F, as seen in Fig. 3.

The operation is as follows: The valve being adjusted to the position shown in Fig. 3, the steam will flow down through the passage $i$, and, entering the supply-chamber of the cylinder A, will strike or impinge against the coincident piston-wing, and cause it to move, together with the cylindrical piston, before the impact of steam, and accordingly rotate its shaft, carrying a band or drive wheel, as shown in Fig. 1. When this piston-wing has moved sufficiently far to bring the next piston-wing past the lower or steam-supplying end of the passage $i$, it (the latter-mentioned piston-wing) will, in turn, be likewise acted upon by a fresh supply of steam, and thus give additional momentum to the piston and its shaft, and increase the power and speed of the same.

The supplied steam will be exhausted at the opposite side of the cylinder A through the passage $i'$, (indicated in dotted lines in Fig. 3,) and through the pipe $j'$. A second supply and exhaust passage is supplied to the upper chamber of the cylinder A, as indicated in the last-mentioned figure, which supply and exhaust passages form one of the two sets of passages above referred to.

Having thus described my invention, I claim and desire to secure by Letters Patent—

1. In a rotary steam, air, water, or other engine, the piston B, supplied with piston-wings D, and having the shaft C, with its ends made tapering, in combination with the cylinder A, having the boxes $a^2$, screw-threaded bushing $c$, glands $e$, and nuts $d$, substantially as and for the purpose specified.

2. In a steam, water, air, or other engine, the combination, with the cylinder A, having the boxes $a^2$, bushing $c$, gland $e$, nuts $d$, and cam-shaped abutments E, of the tapering shaft C and piston B, having sliding wings D, substantially as and for the purpose set forth.

A. B. HAUGHEY.

Witnesses:
E. D. PICKETT,
CHAS. R. BELVILLE.